(12) United States Patent
Mizrachi et al.

(10) Patent No.: US 7,949,813 B2
(45) Date of Patent: May 24, 2011

(54) METHOD AND SYSTEM FOR PROCESSING STATUS BLOCKS IN A CPU BASED ON INDEX VALUES AND INTERRUPT MAPPING

(75) Inventors: Shay Mizrachi, Hod HaSharon (IL); Eliezer Aloni, Zur Yigal (IL)

(73) Assignee: Broadcom Corporation, Irvine, CA (US)

(*) Notice: Subject to any disclaimer, the term of this patent is extended or adjusted under 35 U.S.C. 154(b) by 268 days.

(21) Appl. No.: 12/026,639

(22) Filed: Feb. 6, 2008

(65) Prior Publication Data
US 2008/0215787 A1 Sep. 4, 2008

Related U.S. Application Data

(60) Provisional application No. 60/888,336, filed on Feb. 6, 2007.

(51) Int. Cl.
*G06F 13/24* (2006.01)
(52) U.S. Cl. .......................... 710/267; 710/260
(58) Field of Classification Search .......... 710/260–269, 710/46–50; 712/201–203
See application file for complete search history.

(56) References Cited

U.S. PATENT DOCUMENTS

| | | | |
|---|---|---|---|
| 5,313,648 A * | 5/1994 | Ehlig et al. ................. | 712/228 |
| 6,065,073 A * | 5/2000 | Booth ......................... | 710/46 |
| 6,065,089 A * | 5/2000 | Hickerson et al. ........... | 710/266 |
| 6,128,672 A * | 10/2000 | Lindsley .................... | 710/19 |
| 6,182,176 B1 * | 1/2001 | Ziegler et al. ............... | 710/112 |
| 6,189,067 B1 * | 2/2001 | Lowe et al. .................. | 710/260 |
| 6,266,732 B1 * | 7/2001 | Chen et al. ................... | 710/263 |
| 6,574,694 B1 * | 6/2003 | Chen et al. ................... | 710/263 |
| 6,760,799 B1 * | 7/2004 | Dunlap et al. ............... | 710/260 |
| 6,779,056 B2 * | 8/2004 | O'Neill et al. ............... | 710/52 |
| 6,920,516 B2 * | 7/2005 | Hartwell et al. ............. | 710/263 |
| 6,968,411 B2 * | 11/2005 | Gaur et al. ................... | 710/260 |
| 6,988,155 B2 * | 1/2006 | Lary et al. ................... | 710/260 |
| 7,054,972 B2 * | 5/2006 | Parry et al. .................. | 710/260 |
| 7,269,629 B2 * | 9/2007 | Zmudzinski et al. ........ | 709/207 |
| 7,444,451 B2 * | 10/2008 | Wang et al. .................. | 710/266 |
| 7,478,186 B1 * | 1/2009 | Onufryk et al. .............. | 710/263 |
| 7,496,706 B2 * | 2/2009 | Nguyen et al. .............. | 710/269 |
| 7,526,592 B2 * | 4/2009 | Tsuruta ....................... | 710/268 |
| 7,610,413 B2 * | 10/2009 | Pope et al. .................... | 710/36 |
| 2004/0117534 A1 * | 6/2004 | Parry et al. .................. | 710/260 |
| 2006/0075172 A1 * | 4/2006 | Anand et al. ................. | 710/260 |
| 2008/0155154 A1 * | 6/2008 | Kenan et al. ................. | 710/263 |

* cited by examiner

*Primary Examiner* — Raymond N Phan
(74) *Attorney, Agent, or Firm* — McAndrews, Held & Malloy, Ltd.

(57) ABSTRACT

Certain aspects of a method and system for processing status blocks based on interrupt mapping may be disclosed. Exemplary aspects of the method may include determining whether a particular status block has been processed by at least one CPU based on comparing a value of a first register with a value of a second register, wherein the first register may comprise a running index value of at least one client segment within the particular status block and the second register may comprise a current running index value of at least one client segment. An interrupt may be generated, if the value of the first register is not equal to the value of the second register. The particular status block may be processed by at least one CPU based on the generated interrupt.

22 Claims, 6 Drawing Sheets

METHOD AND SYSTEM FOR PROCESSING STATUS BLOCKS IN A CPU BASED ON INDEX VALUES AND INTERRUPT MAPPING

CROSS-REFERENCE TO RELATED APPLICATIONS/INCORPORATION BY REFERENCE

This application makes reference to, claims priority to, and claims the benefit of: U.S. Provisional Application Ser. No. 60/888,336 filed on Feb. 6, 2007.

The above referenced application is hereby incorporated herein by reference in its entirety.

FIELD OF THE INVENTION

Certain embodiments of the invention relate to network interfaces. More specifically, certain embodiments of the invention relate to a method and system for processing status blocks based on interrupt mapping.

BACKGROUND OF THE INVENTION

Hardware and software may often be used to support asynchronous data transfers between two memory regions in data network connections, often on different systems. Each host system may serve as a source (initiator) system which initiates a message data transfer (message send operation) to a target system of a message passing operation (message receive operation). Examples of such a system may include host servers providing a variety of applications or services and I/O units providing storage oriented and network oriented I/O services. Requests for work, for example, data movement operations including message send/receive operations and remote direct memory access (RDMA) read/write operations may be posted to work queues associated with a given hardware adapter, the requested operation may then be performed. It may be the responsibility of the system which initiates such a request to check for its completion. In order to optimize use of limited system resources, completion queues may be provided to coalesce completion status from multiple work queues belonging to a single hardware adapter. After a request for work has been performed by system hardware, notification of a completion event may be placed on the completion queue. Completion queues may provide a single location for system hardware to check for multiple work queue completions.

Completion queues may support one or more modes of operation. In one mode of operation, when an item is placed on the completion queue, an event may be triggered to notify the requester of the completion. This may often be referred to as an interrupt-driven model. In another mode of operation, an item may be placed on the completion queue, and no event may be signaled. It may be then the responsibility of the request system to periodically check the completion queue for completed requests. This may be referred to as polling for completions.

A status block may comprise a driver that may be enabled to determine whether a particular completion queue has been updated. A plurality of status blocks may be coalesced based on one or more modes per protocol in each status block segment. For example, in a collect mode of operation, the first event that occurs while a timer is disarmed may arm the timer and reset the time value of the timer. When a timer count reaches the timer trip point, a status block may be generated and the timer may be disarmed. In a timeout mode of operation, the first event that occurs while a timer is disarmed may arm the timer and reset the time value of the timer. An event that may occur before the timer count reaches the timer trip point may reset the time value of the timer. When the timer count reaches the timer trip point, a status block may be generated and the timer may be disarmed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for processing status blocks based on interrupt mapping, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing status blocks based on interrupt mapping. Aspects of the method and system may comprise determining whether a particular status block has been processed by at least one CPU based on comparing a value of a first register with a value of a second register, wherein the first register may comprise a running index value of at least one client segment within the particular status block and the second register may comprise a current running index value of at least one client segment. An interrupt may be generated, if the value of the first register is not equal to the value of the second register. The particular status block may be processed by at least one CPU based on the generated interrupt.

Figure 1:
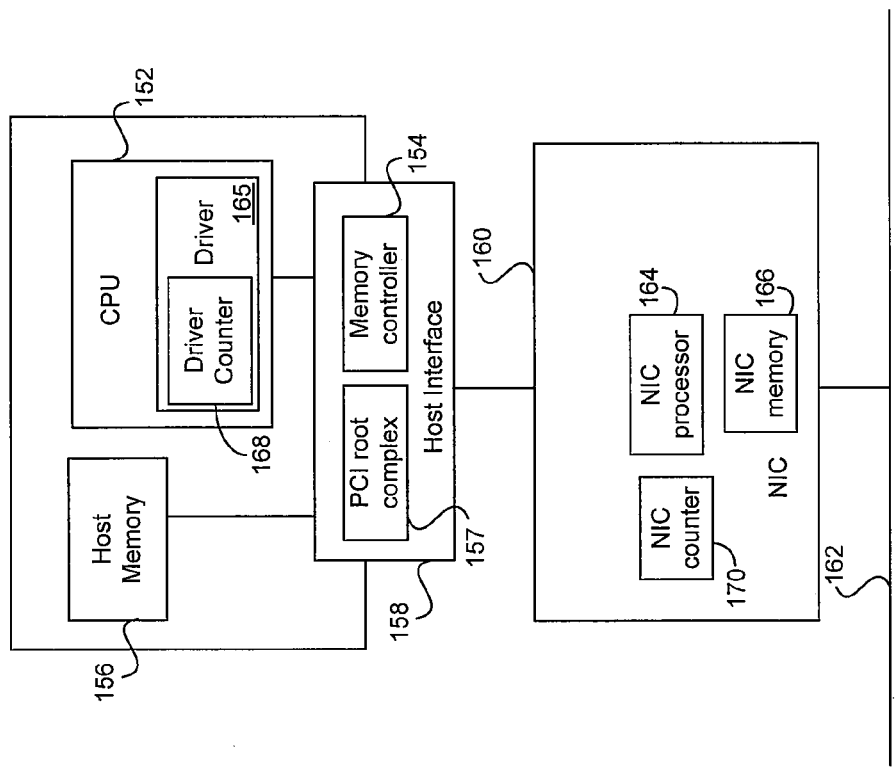
FIG. 1 is an exemplary embodiment of a system for host coalescing, in accordance with an embodiment of the invention.

FIG. 1 is a block diagram of an exemplary system for host coalescing, in accordance with an embodiment of the invention. Referring to FIG. 1, the system may comprise a CPU 152, a host memory 156, a host interface 158, NIC 160 and an Ethernet bus 162. The NIC 160 may comprise a NIC processor 164, NIC memory 166 and a NIC counter 170. The CPU 152 may comprise a driver 165. The driver 165 may comprise a driver counter 168 and communicates with the NIC 160. The host interface 158 may be, for example, a peripheral component interconnect (PCI), PCI-X, PCI-Express, ISA, SCSI or other type of bus. The host interface 158 may comprise a PCI root complex 157 and a memory controller 154. The host interface 158 may be coupled to PCI buses and/or devices, one or more processors, and memory, for example, host memory 156. Notwithstanding, the host memory 156 may be directly coupled to the NIC 160. In this case, the host interface 158 may implement the PCI root complex functionally and may be coupled to PCI buses and/or devices, one or more processors, and memory. The memory controller 156 may be coupled to the CPU 154, to the memory 156 and to the host interface 158. The host interface 158 may be coupled to the NIC 160. The NIC 160 may communicate with an external network via a wired and/or a wireless connection, for example. The wireless connection may be a wireless local area network (WLAN) connection as supported by the IEEE 802.11 standards, for example.

The NIC processor 164 may comprise suitable logic, circuitry and/or code that may enable accumulation or coalescing of task completions. A plurality of task completions per-connection may be coalesced or aggregated before sending an event to the event queue. An entry may be posted to the event queue (EQ) for a particular connection after receiving the particular event. A particular CPU 152 may be interrupted based on posting the entry to the event queue.

The driver 165 may be enabled to set a flag, for example, an arm flag at connection initialization and after processing the completion queue. The driver 165 may be enabled to set a flag, for example, a sequence to notify flag to indicate a particular sequence number at which it may be notified for the next iteration.

The NIC counter 170 may comprise suitable logic, circuitry and/or code that may be enabled to count the number of bytes in the buffer placed by the NIC 160 in the host memory 156 when a new packet arrives. The NIC 160 may be enabled to increment the NIC counter 170 with the number of bytes in the buffer placed in the host memory 156 when a new packet arrives.

The driver counter 168 may comprise suitable logic, circuitry and/or code that may be enabled to count the number of bytes in the buffer returned by the CPU 152 in response to the buffer being placed in the host memory 156 with a new packet of data by the NIC 160. The driver 165 may be enabled to increment the driver counter 168 with the number of bytes in the return buffer from the CPU 152.

Figure 2A:
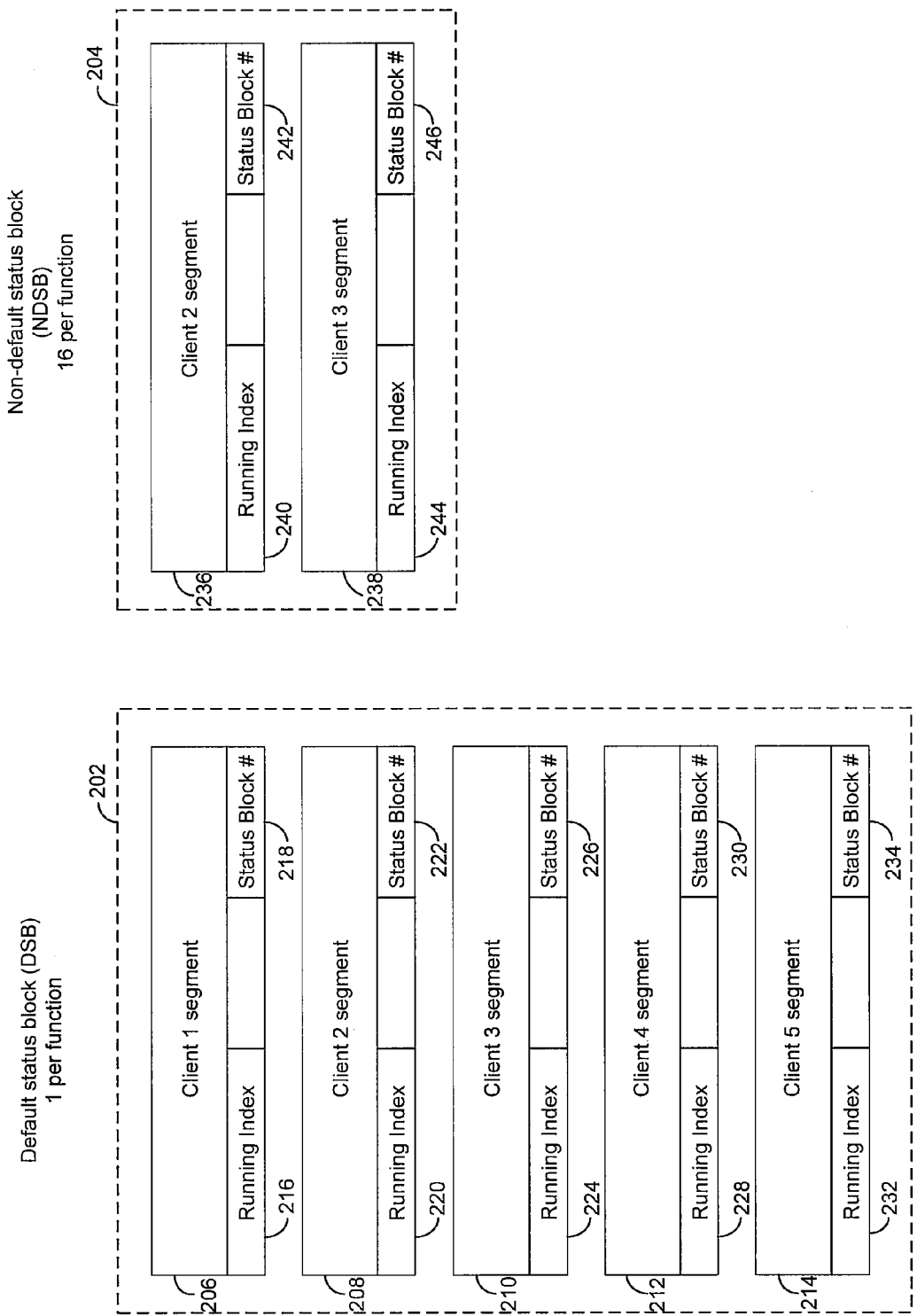
FIG. 2A is a block diagram illustrating an exemplary embodiment of a default status block and a non-default status block, in accordance with an embodiment of the invention.

FIG. 2A is a block diagram illustrating an exemplary embodiment of a default status block and a non-default status block, in accordance with an embodiment of the invention. Referring to FIG. 2A, there is shown a default status block (DSB) 202 and a non-default status block (NDSB) 204. The DSB 202 may comprise a plurality of clients and each client may be associated with a segment in the DSB 202. For example, the DSB 202 may comprise a client 1 segment 206, client 2 segment 208, client 3 segment 210, client 4 segment 212 and client 5 segment 214. Each client segment may comprise a running index field and a status block number field. For example, client segment 1 may comprise a running index field 216 and a status block number field 218. Client segment 2 may comprise a running index field 220 and a status block number field 222. Client segment 3 may comprise a running index field 224 and a status block number field 226. Client segment 4 may comprise a running index field 228 and a status block number field 230. Client segment 5 may comprise a running index field 232 and a status block number field 234.

The NDSB 204 may comprise a plurality of clients and each client may be associated with a segment in the NDSB 204. For example, the NDSB 204 may comprise a client 2 segment 236 and a client 3 segment 238. Each client segment may comprise a running index field and a status block number field. For example, client segment 2 may comprise a running index field 240 and a status block number field 242. Client segment 3 may comprise a running index field 220 and a status block number field 222. Client segment 3 may comprise a running index field 244 and a status block number field 246.

The DSB 202 may comprise a driver, which may be enabled to determine whether a particular completion queue has been updated. Each DSB 202 may comprise a plurality of consumers and producers. In accordance with an embodiment of the invention, each DSB 202 may be associated with a particular PCI function. Each of the plurality of clients within the DSB 202 may be enabled to build a client segment and write the associated client segment over a peripheral component interconnect (PCI). For example, client 1 may be enabled to build and write the client 1 segment 206 over PCI.

The running index field associated with a client may be enabled to carry information regarding a particular client segment. For example, the running index field 216 may be enabled to carry information regarding client 1 segment 206. The NIC 160 may be enabled to increment the running index field of a particular client segment within the status block by 1 before writing a new status block to the host memory 156. For example, the NIC 160 may be enabled to increment the running index field 216 of the client 1 segment 206 by 1 before writing a new status block to the host memory 156. The driver 165 in the NIC 160 may be enabled to compare the running index of the last processed status block with the running index of the current status block. If the running index of the last processed status block is not the same as the running index of the current status block, the driver 165 may indicate the current status block to be a new status block and determine the particular completion queues that were updated. If the running index of the last processed status block is the same as the running index of the current status block, the driver 165 processes the next available status block.

The status block number field associated with a client may be enabled to indicate a particular client segment within the DSB 202. For example, the status block number field 218 may be enabled to indicate the client 1 segment 206 within the DSB 202.

The NDSB 204 may comprise a driver to determine whether a particular completion queue has been updated. Each NDSB 204 may comprise a plurality of consumers and producers. In accordance with an embodiment of the invention, a plurality of NDSB's, for example, 16 NDSB's may be associated with a particular PCI function. Each of the plurality of clients within the NDSB 204 may be enabled to build a client segment and write the associated client segment over a peripheral component interconnect (PCI). For example, client 2 may be enabled to build and write the client 2 segment 236 over PCI.

Figure 2B:
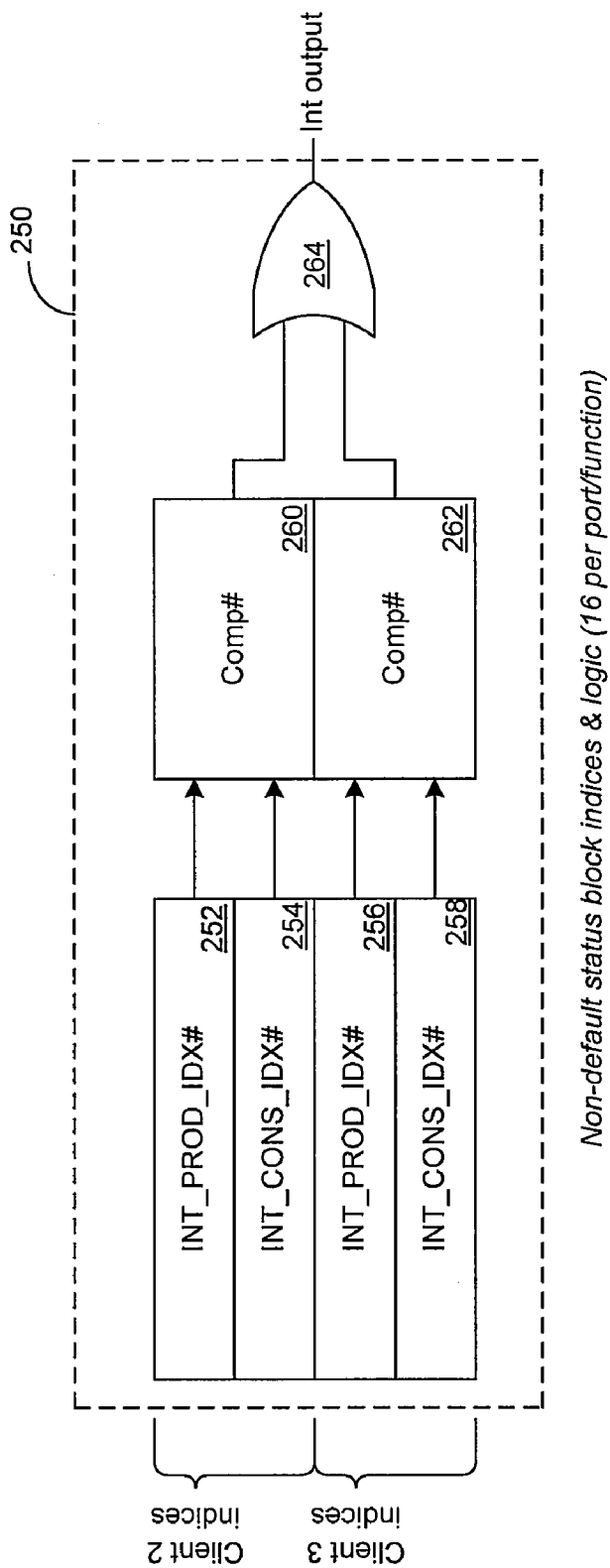
FIG. 2B is a block diagram illustrating an exemplary embodiment for generation of an interrupt for a non-default status block, in accordance with an embodiment of the invention.

FIG. 2B is a block diagram illustrating an exemplary embodiment for generation of an interrupt for a non-default status block, in accordance with an embodiment of the invention. Referring to FIG. 2B, there is shown an interrupt generation unit (IGU) 250 for NDSB 204. The IGU 250 may comprise a plurality of registers 252, 254, 256 and 258, a plurality of comparators 260 and 262 and an OR gate 264.

Each register may be enabled to store the value of a running index of a particular client segment within the NDSB 204. For example, register 252 may be enabled to store the value of the interrupt producer running index of client 2 segment 236. The register 254 may be enabled to store the value of the interrupt consumer running index of client 2 segment 236. The register 256 may be enabled to store the value of the interrupt producer running index of client 3 segment 238. The register 258 may be enabled to store the value of the interrupt consumer running index of client 3 segment 238.

The plurality of registers 252 and 256 may be updated by firmware or the NIC 160. The NIC 160 may be enabled to increment the running index field of a particular client segment within the status block by 1 before writing a new status block to the host memory 156. For example, the NIC 160 may be enabled to increment the running index field 240 of the client 2 segment 236 by 1 before writing a new status block to the host memory 156. The updated running index field value may be stored in the register 252 as the interrupt producer running index of client 2 segment 236. Similarly, the NIC 160 may be enabled to increment the running index field 244 of the client 3 segment 238 by 1 before writing a new status block to the host memory 156. The updated running index field value may be stored in the register 256 as the interrupt producer running index of client 3 segment 238.

The host system or CPU 152 may be enabled to update the plurality of registers 254 and 258 indicating the current value of the interrupt consumer running index of client 2 segment 236 and the interrupt consumer running index of client 3 segment 238 respectively.

The comparator 260 may comprise suitable logic, circuitry and/or code that may be enabled to compare the stored values of the registers 252 and 254 and generate a signal to the OR gate 264 based on the comparison. Similarly, the comparator 262 may comprise suitable logic, circuitry and/or code that may be enabled to compare the stored values of the registers 256 and 258 and generate a signal to the OR gate 264 based on the comparison.

If either of the plurality of comparators 260 and 262 detects a difference in the stored values of the registers 252 and 254 or the stored values of the registers 256 and 258, an interrupt may be generated by the NIC 160 to the host system or CPU 152. The generation of an interrupt may indicate the presence of a new status block. The host system or CPU 152 may be enabled to process the new status block. The absence of an interrupt may indicate that the current status block has been processed by the host system. In accordance with an embodiment of the invention, there may be a plurality of interrupts generated per PCI function, for example, 16 interrupts, one interrupt per NDSB 204.

Figure 2C:
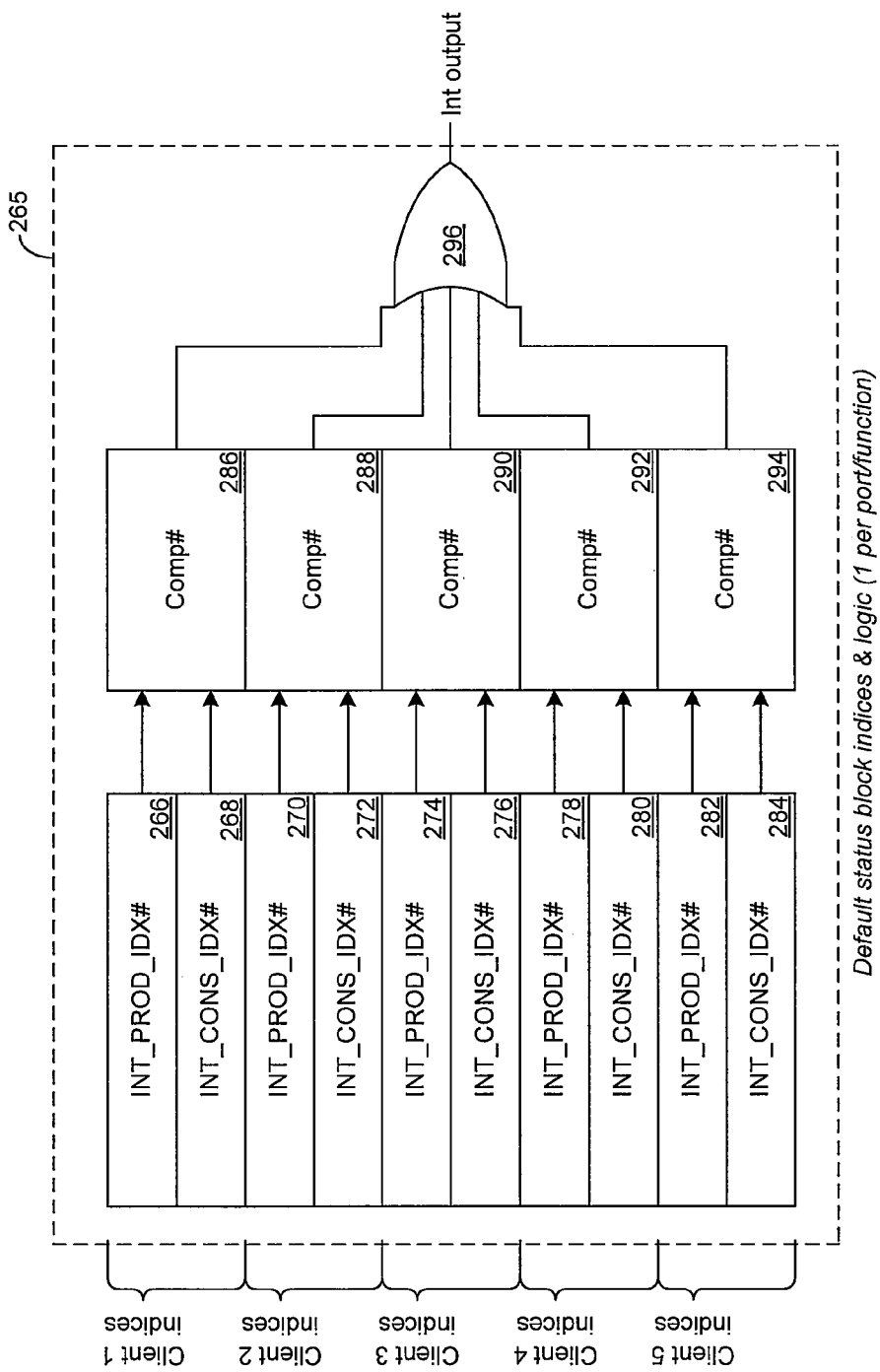
FIG. 2C is a block diagram illustrating an exemplary embodiment for generation of an interrupt for a default status block, in accordance with an embodiment of the invention.

FIG. 2C is a block diagram illustrating an exemplary embodiment for generation of an interrupt for a default status block, in accordance with an embodiment of the invention. Referring to FIG. 2C, there is shown an interrupt generation unit (IGU) 265 for DSB 202. The IGU 265 may comprise a plurality of registers 266, 268, 270, 272, 274, 276, 278, 280, 282 and 284, a plurality of comparators 286, 288, 290, 292 and 294, and an OR gate 296. Each register may be enabled to store the value of a running index of a particular client segment within the DSB 202. For example, register 266 may be enabled to store the value of the interrupt producer running index of client 1 segment 206. The register 268 may be enabled to store the value of the interrupt consumer running index of client 1 segment 206. The register 270 may be enabled to store the value of the interrupt producer running index of client 2 segment 208. The register 272 may be enabled to store the value of the interrupt consumer running index of client 2 segment 208. The register 274 may be enabled to store the value of the interrupt producer running index of client 3 segment 210. The register 276 may be enabled to store the value of the interrupt consumer running index of client 3 segment 210. The register 278 may be enabled to store the value of the interrupt producer running index of client 4 segment 212. The register 280 may be enabled to store the value of the interrupt consumer running index of client 4 segment 212. The register 282 may be enabled to store the value of the interrupt producer running index of client 5 segment 214. The register 284 may be enabled to store the value of the interrupt consumer running index of client 5 segment 214.

The plurality of registers 266, 270, 274, 278 and 282 may be updated by firmware and/or the NIC 160. The NIC 160, for example, may be enabled to increment the running index field of a particular client segment within the status block by 1 before writing a new status block to the host memory 156. For example, the NIC 160 may be enabled to increment the running index field 216 of the client 1 segment 206 by 1 before writing a new status block to the host memory 156. The updated running index field value may be stored in the register 266 as the interrupt producer running index of client 1 segment 206. Similarly, the NIC 160 may be enabled to increment the running index field 220 of the client 2 segment 208 by 1 before writing a new status block to the host memory 156. The updated running index field value may be stored in the register 270 as the interrupt producer running index of client 2 segment 208. The NIC 160 may be enabled to increment the running index field 224 of the client 3 segment 210 by 1 before writing a new status block to the host memory 156. The updated running index field value may be stored in the register 274 as the interrupt producer running index of client 3 segment 210. The NIC 160 may be enabled to increment the running index field 228 of the client 4 segment 212 by 1 before writing a new status block to the host memory 156. The updated running index field value may be stored in the register 278 as the interrupt producer running index of client 4 segment 212. The NIC 160 may be enabled to increment the running index field 232 of the client 5 segment 214 by 1 before writing a new status block to the host memory 156. The updated running index field value may be stored in the register 282 as the interrupt producer running index of client 5 segment 214.

The host system or CPU 152 may be enabled to update the plurality of registers 268, 272, 276, 280 and 284 indicating the current value of the interrupt consumer running indices of client 1 segment 206, client 2 segment 208, client 3 segment 210, client 4 segment 212 and client 5 segment 214 respectively.

The comparator 286 may comprise suitable logic, circuitry and/or code that may be enabled to compare the stored values of the registers 266 and 268 and generate a signal to the OR gate 296 based on the comparison. Similarly, the comparator 288 may comprise suitable logic, circuitry and/or code that may be enabled to compare the stored values of the registers 270 and 272 and generate a signal to the OR gate 296 based on the comparison. The comparator 290 may comprise suitable logic, circuitry and/or code that may be enabled to compare the stored values of the registers 274 and 276 and generate a signal to the OR gate 296 based on the comparison. The comparator 292 may comprise suitable logic, circuitry and/or code that may be enabled to compare the stored values of the registers 278 and 280 and generate a signal to the OR gate 296 based on the comparison. The comparator 294 may comprise suitable logic, circuitry and/or code that may be enabled to compare the stored values of the registers 282 and 284 and generate a signal to the OR gate 296 based on the comparison.

If either of the plurality of comparators 286, 288, 290, 292 and 294 detects a difference in the stored values of the registers 266 and 268 or the stored values of the registers 270 and 272 or the stored values of the registers 274 and 276 or the stored values of the registers 278 and 280 or the stored values of the registers 282 and 284, an interrupt may be generated by the NIC 160 to the host system or CPU 152. The generation of an interrupt may indicate the presence of a new status block. The host system or CPU 152 may be enabled to process the new status block. The absence of an interrupt may indicate that the current status block has already been processed by the host system. In accordance with an embodiment of the invention, there may be one interrupt generated per PCI function, for example, one interrupt per DSB 202.

Figure 3:
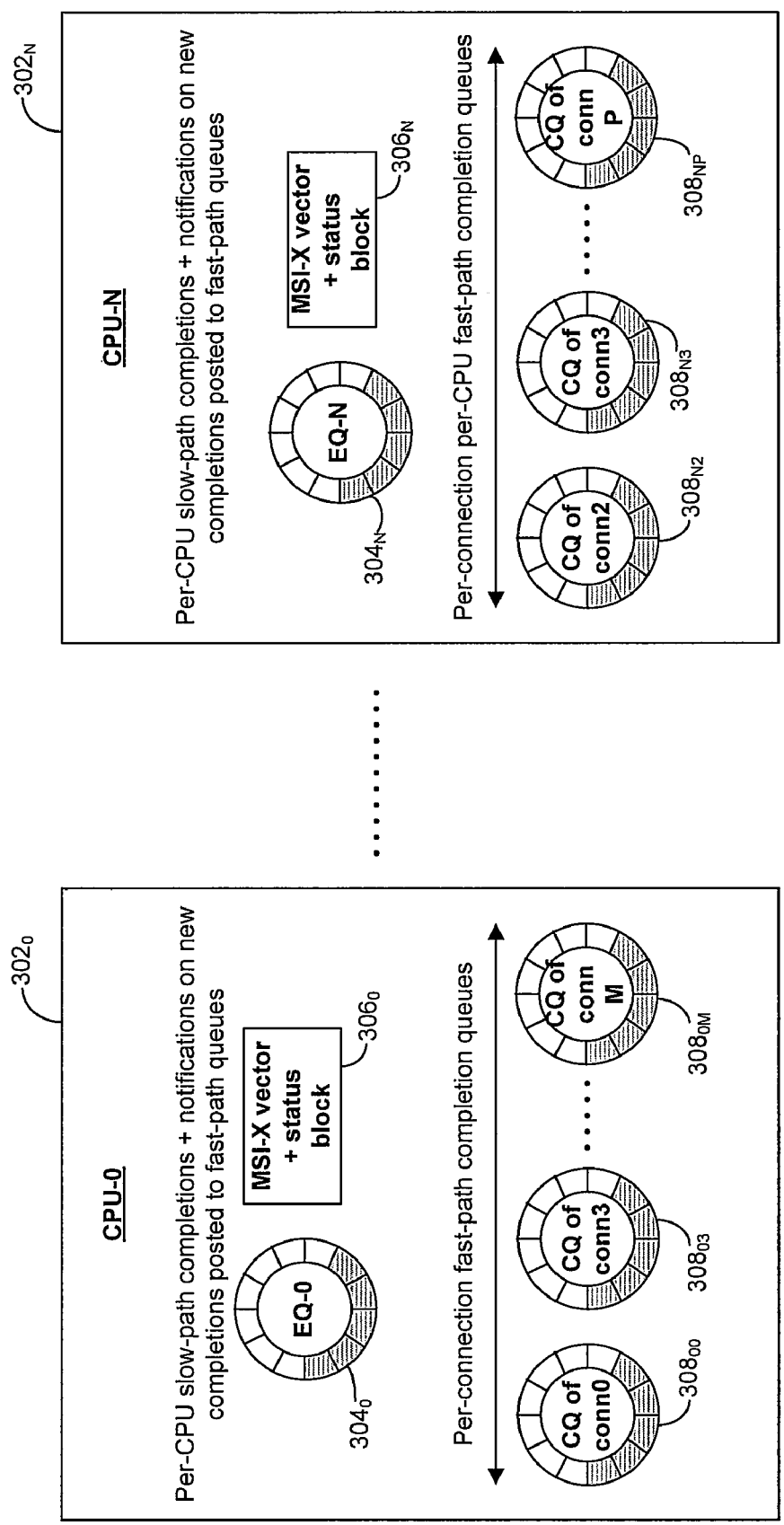
FIG. 3 is a block diagram of an exemplary system for host software concurrent processing of multiple network connections by host coalescing, in accordance with an embodiment of the invention.

FIG. 3 is a block diagram of an exemplary system for host software concurrent processing of multiple network connections by coalescing task completions, in accordance with an embodiment of the invention. Referring to FIG. 3, there is shown a plurality of interconnected central processing units (CPUs), CPU-0 $302_0$, CPU-1 $302_1$ ... CPU-N $302_N$. Each CPU may comprise an event queue (EQ), a message signaled interrupt (MSI) or an extended message signaled interrupt (MSI-X) and status block, and a completion queue (CQ) for each network connection. Each CPU may be associated with a plurality of network connections, for example. For example, CPU-0 $302_0$ may comprise an EQ-0 $304_0$, a interrupt vector and status block $306_0$, and a CQ for connection-0 $308_{00}$, a CQ for connection-3 $308_{03}$ ..., and a CQ for connection-M $308_{0M}$. Similarly, CPU-N $302_N$ may comprise an EQ-N $304_N$, a interrupt vector and status block $306_N$, a CQ for connection-2 $308_{N2}$, a CQ for connection-3 $308_{N3}$ ..., and a CQ for connection-P $308_{NP}$.

Each event queue, for example, EQ-0 $304_0$, EQ-1 $304_1$ ... EQ-N $340_N$ may be enabled to encapsulate asynchronous event dispatch machinery which may extract events from the queue and dispatch them. In one embodiment, the EQ, for example, EQ-0 $304_0$, EQ-1 $304_1$ ... EQ-N $304_N$ may be enabled to dispatch or process events sequentially or in the same order as they are enqueued.

The plurality of interrupt and status blocks for each CPU, for example, interrupt vector and status block $306_0$, $306_1$ ... $306_N$ may comprise one or more message signaled interrupts (MSI) or extended message signaled interrupts (MSI-X). Message signaled interrupts (MSIs) may be in-band messages that may target an address range in the host bridge unlike fixed interrupts. Since the messages are in-band, the receipt of the message may be utilized to push data associated with the interrupt. Each MSI message assigned to a device may be associated with a unique message in the CPU, for example, a MSI-X vector in the interrupt and status block $306_0$ may be associated with a unique message in the CPU-0 $302_0$. The PCI functions may request one or more MSI messages. In one embodiment, the host software may allocate fewer MSI messages to a function than the function requested.

Extended MSI (MSI-X) may include additional ability for a function to allocate more messages, for example, up to 2048 messages by making the address and data value used for each message independent of any other MSI-X message. The MSI-X may also allow software the ability to choose to use the same MSI address and/or data value in multiple MSI-X slots, for example, when the system allocates fewer MSI-X messages to the device than the device requested.

The MSI-X interrupts may be edge triggered since the interrupt is signaled with a posted write command by the device targeting a pre-allocated area of memory on the host bridge. However, some host bridges may have the ability to latch the acceptance of an MSI-X message and may effectively treat it as a level signaled interrupt. The MSI-X interrupts may enable writing to a segment of memory instead of asserting a given IRQ pin. Each device may have one or more unique memory locations to which MSI-X messages may be written. An advantage of the MSI interrupts is that data may be pushed along with the MSI event, allowing for greater functionality. The MSI-X interrupt mechanism may enable the system software to configure each vector with an independent message address and message data that may be specified by a table that may reside in host memory. The MSI-X mechanism may enable the device functions to support two or more vectors, which may be configured to target different CPUs to increase scalability.

Each completion queue (CQ) may be associated with a particular network connection. The plurality of completion queues associated with each connection, for example, CQ for connection-0 $308_{00}$, a CQ for connection-3 $308_{03}$ ..., and a CQ for connection-M $308_{0M}$ may be provided to coalesce completion status from multiple work queues associated with a single hardware adapter, for example, a NIC 160. After a request for work has been performed by system hardware, a notification of a completion event may be placed on the completion queue, for example, CQ for connection-0 $308_{00}$. In one exemplary aspect of the invention, the completion queues may provide a single location for system hardware to check for multiple work queue completions.

Figure 4:
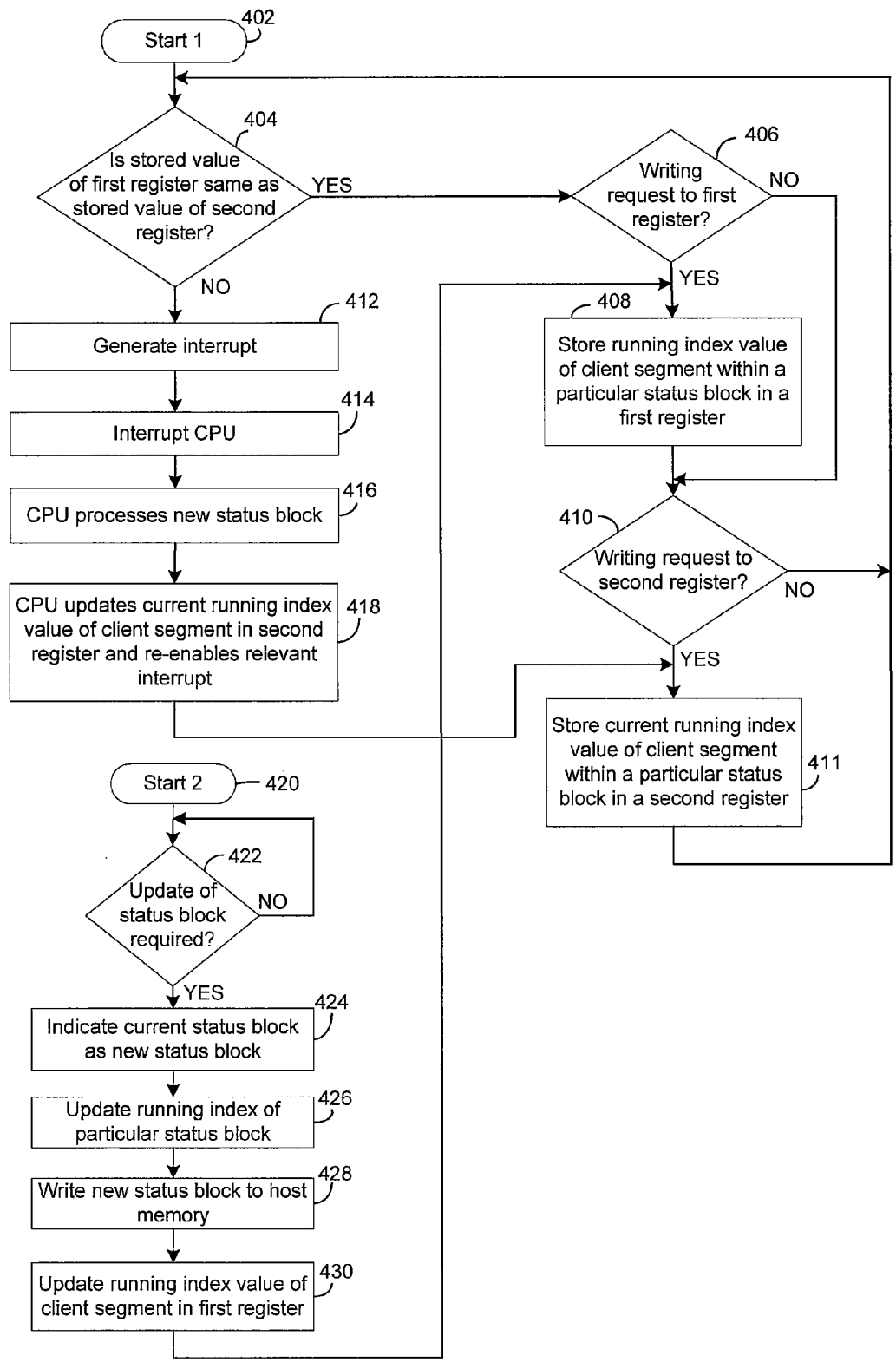
FIG. 4 is a flow chart illustrating exemplary steps for processing status blocks based on interrupt mapping, in accordance with an embodiment of the invention.

FIG. 4 is a flow chart illustrating exemplary steps for processing status blocks based on interrupt mapping, in accordance with an embodiment of the invention. Referring to FIG. 4, exemplary steps may begin at start 1 step 402. In step 404, it may be determined whether a stored value of the first register, for example, register 266 is equal to a stored value of the second register, for example, register 268. If the stored value of the first register, for example, register 266 is equal to the stored value of the second register, for example, register 268, control passes to step 406. In step 406, it may be determined whether a request is being written to the first register, for example, register 266. If a request is being written to the first register, for example, register 266, control passes to step 408. In step 408, after the status block has been written to host memory, a first register, for example, register 266 may be enabled to store the running index value of the client segment, for example, the interrupt producer running index of client 1 segment 206. Control then passes to step 410. If a request is not being written to the first register, for example, register 266, control passes to step 410.

In step 410, it may be determined whether a request is being written to the second register, for example, register 268. If a request is being written to the second register, for example, register 268, control passes to step 411. In step 411, the second register, for example, register 268 may be enabled to store the current running index value of the client segment, for example, the interrupt consumer running index of client 1 segment 206. Control then returns to step 404. If a request is not being written to the second register, for example, register 268, control returns to step 404.

If the stored value of the first register, for example, register 266 is not equal to the stored value of the second register, for example, register 268, control passes to step 412. In step 412, the NIC 160 may be enabled to generate an interrupt that may be conditioned by the CPU 152. In step 414, the NIC 160 may be enabled to interrupt the CPU 152, and the particular interrupt may be locked to prevent reuse by the NIC 160. In step 416, the CPU 152 may be enabled to process the new status block based on the generated interrupt. In step 418, the CPU 152 may be enabled to update the second register, for example, register 268 comprising the current running index value of at least one client segment, for example, the interrupt consumer running index of client 1 segment 206 and re-enable the particular interrupt. Control then passes to step 411.

In an independent flow, exemplary steps may begin at start 2 step 420. In step 422, it may be determined whether a status block needs to be updated. If a status block does not require updating, control returns to step 422. If a status block needs to be updated, control passes to step 424. In step 424, the current status block may be indicated as a new status block. In step 426, the NIC 160 may be enabled to increment the running index value, for example, running index field 216 of at least one client segment, for example, client 1 segment 206 within the particular status block, for example, DSB 202. In step 428, the NIC may write the new status block to host memory 156. In step 430, the NIC 160 may be enabled to update the first register, for example, register 266 comprising the running index value of at least one client segment based on the incrementing. For example, the NIC 160 may be enabled to update the running index value of at least one client segment, for example, the interrupt producer running index of client 1 segment 206 based on the incrementing. Control then passes to step 408.

In accordance with an embodiment of the invention, a method and system for processing status blocks based on interrupt mapping may comprise determining whether a particular status block, for example, DSB 202 or NDSB 204 has been processed by at least one CPU, for example, CPU-0 $302_0$, based on comparing a stored value of a first register, for example, register 266 with a stored value of a second register, for example, register 268.

Each register may be enabled to store the value of a running index of at least one client segment within the particular status block, for example, DSB 202. For example, register 266 may be enabled to store the value of the interrupt producer running index of client 1 segment 206. The register 268 may be enabled to store the value of the current running index value of client 1 segment 206, for example, the interrupt consumer running index of client 1 segment 206. The NIC 160 may be enabled to generate an interrupt when the stored value of the first register, for example, register 266 is not equal to the stored value of the second register, for example, register 268. The NIC 160 may be enabled to interrupt at least one CPU, for example, CPU-0 $302_0$, based on the generated interrupt. The generated interrupt may comprise one or more of a message signaled interrupt (MSI), an extended message signaled interrupt (MSI-X) and/or an interrupt line.

If an interrupt is generated, the particular status block may be indicated as a new status block. The new status block may be processed by at least one CPU, for example, CPU-0 $302_0$, based on the generated interrupt. The NIC 160 may be enabled to increment the running index value, for example, running index field 216 of at least one client segment, for example, client 1 segment 206 within the particular status block, for example, DSB 202 prior to writing the new status block to host memory 156. The NIC 160 may be enabled to update the first register, for example, register 266 comprising the running index value of at least one client segment based on the incrementing. For example, the NIC 160 may be enabled to update the running index value of at least one client segment, for example, the interrupt producer running index of client 1 segment 206 based on the incrementing. The CPU-0 $302_0$ may be enabled to update the second register, for example, register 268 comprising the current running index value of at least one client segment, for example, the interrupt consumer running index of client 1 segment 206.

Another embodiment of the invention may provide a machine-readable storage, having stored thereon, a computer program having at least one code section executable by a machine, thereby causing the machine to perform the steps as described above for processing status blocks based on interrupt mapping.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data, the method comprising:
    determining whether a particular status block has been processed by at least one CPU based on comparing a stored value of a first register with a stored value of a second register, wherein said first register comprises a running index value of at least one client segment within said particular status block and said second register comprises a current running index value of said at least one client segment.

2. The method according to claim 1, comprising generating an interrupt when said stored value of said first register is not equal to said stored value of said second register.

3. The method according to claim 1, comprising updating said second register comprising said current running index value of said at least one client segment by said at least one CPU.

4. The method according to claim 1, wherein said particular status block is a default status block.

5. The method according to claim 1, wherein said particular status block is a non-default status block.

6. The method according to claim 2, comprising interrupting said at least one CPU based on said generated interrupt.

7. The method according to claim 2, wherein said generated interrupt comprises one or more of: a message signaled interrupt (MSI), an extended message signaled interrupt (MSI-X) and/or an interrupt line.

8. The method according to claim 2, comprising indicating said particular status block as a new status block based on said generated interrupt.

9. The method according to claim 8, comprising processing said new status block by said at least one CPU based on said generated interrupt.

10. The method according to claim 9, comprising incrementing said running index value of said at least one client segment within said particular status block prior to writing said new status block to host memory.

11. The method according to claim 10, comprising updating said first register comprising said running index value of said at least one client segment based on said incrementing.

12. A system for processing data, the system comprising:
one or more circuits that enables determination of whether a particular status block has been processed by at least one CPU based on comparing a stored value of a first register with a stored value of a second register, wherein said first register comprises a running index value of at least one client segment within said particular status block and said second register comprises a current running index value of said at least one client segment.

13. The system according to claim 12, wherein said one or more circuits enables generation of an interrupt when said stored value of said first register is not equal to said stored value of said second register.

14. The system according to claim 12, wherein said at least one CPU enables updating of said second register comprising said current running index value of said at least one client segment.

15. The system according to claim 12, wherein said particular status block is a default status block.

16. The system according to claim 12, wherein said particular status block is a non-default status block.

17. The system according to claim 13, wherein said one or more circuits enables interruption of said at least one CPU based on said generated interrupt.

18. The system according to claim 13, wherein said generated interrupt comprises one or more of: a message signaled interrupt (MSI), an extended message signaled interrupt (MSI-X) and/or an interrupt line.

19. The system according to claim 13, wherein said one or more circuits enables indication of said particular status block as a new status block based on said generated interrupt.

20. The system according to claim 19, wherein said at least one CPU enables processing of said new status block based on said generated interrupt.

21. The system according to claim 20, wherein said one or more circuits enables incrementing of said running index value of said at least one client segment within said particular status block prior to writing said new status block to host memory.

22. The system according to claim 21, wherein said one or more circuits enables updating of said first register comprising said running index value of said at least one client segment based on said incrementing.

* * * * *